US012421761B2

(12) United States Patent
Hykamp

(10) Patent No.: US 12,421,761 B2
(45) Date of Patent: Sep. 23, 2025

(54) FOLDING LOCK PICK SET

(71) Applicant: DB IMPORTS INC., Toronto (CA)

(72) Inventor: Mikael Alexander Hykamp, Toronto (CA)

(73) Assignee: DB IMPORTS INC., Toronto (CA)

( * ) Notice: Subject to any disclaimer, the term of this patent is extended or adjusted under 35 U.S.C. 154(b) by 103 days.

(21) Appl. No.: 18/212,399

(22) Filed: Jun. 21, 2023

(65) Prior Publication Data

US 2023/0417078 A1 Dec. 28, 2023

Related U.S. Application Data

(60) Provisional application No. 63/354,923, filed on Jun. 23, 2022.

(51) Int. Cl.
*E05B 19/20* (2006.01)
*E05B 19/00* (2006.01)

(52) U.S. Cl.
CPC .......... *E05B 19/20* (2013.01); *E05B 19/0005* (2013.01); *E05B 19/0082* (2013.01)

(58) Field of Classification Search
CPC ............. E05B 19/0005; E05B 19/0011; E05B 19/0082; E05B 19/205; E05B 19/20
See application file for complete search history.

(56) References Cited

U.S. PATENT DOCUMENTS 2,836,053 A * 5/1958 Starrett ................ A45C 11/324 70/456 R
3,452,562 A * 7/1969 Loveless ................. E05B 19/20 70/456 R
4,006,613 A * 2/1977 Zion ....................... E05B 19/20 7/168
4,667,494 A * 5/1987 Joosten ................. E05B 19/205 81/488
7,127,922 B2 * 10/2006 Khounsombath .... A45C 11/324 7/118
7,343,838 B2 * 3/2008 Tansbo .................... A01L 11/00 7/168

(Continued)

FOREIGN PATENT DOCUMENTS

DE 202015008541 U1 * 3/2016 ............ E05B 19/20

*Primary Examiner* — Christopher J Boswell
(74) *Attorney, Agent, or Firm* — HILL & SCHUMACHER

(57) ABSTRACT

The present disclosure discloses a folding lock pick set having a set of lock picks pivotally mounted in the housing at their proximal ends, a locking bar pivotally mounted at its proximal end which is adjacent to the pivotally mounted proximal ends of the lock picks. An L-shaped tension wrench is stored inside the locking bar. The tension wrench is released by the depressing locking bar so that the back end of the shorter section of the tension wrench lowers past the fame of the housing and this allows for the tension wrench to slide out the distal end of the housing. When the locking mechanism/bar is not depressed the tension wrench sits securely inside the housing. The proximal end of the locking bar includes a pawl which engages two (2) cut-outs in the proximal ends of the lock picks, one cut-out being engaged by the pawl when the picks are stored in the housing to prevent them rotating out of the housing, and the other being engaged by the pawl when a given lock pick is rotated out of the housing to prevent it from rotating while the lock operation is ongoing.

12 Claims, 7 Drawing Sheets

(56) References Cited

U.S. PATENT DOCUMENTS

| | | | | |
|---|---|---|---|---|
| 8,359,891 | B2 * | 1/2013 | Fujimoto | E05B 19/0082<br>70/459 |
| 2020/0318387 | A1 * | 10/2020 | Shimura | E05B 19/046 |
| 2021/0189765 | A1 * | 6/2021 | Joshlin | E05B 19/0082 |

* cited by examiner

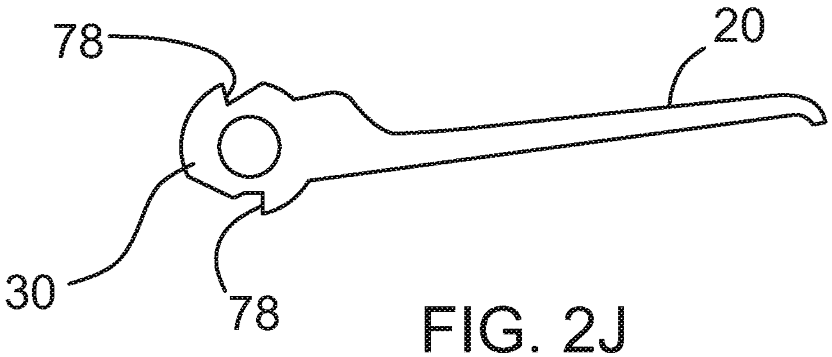
FIG. 2J
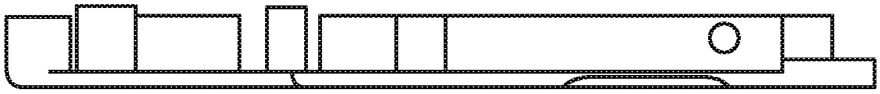
FIG. 2K
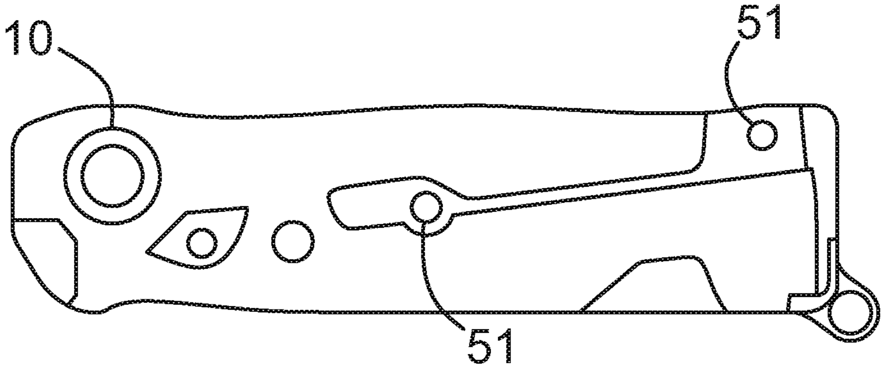
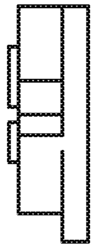
FIG. 2L
FIG. 2M

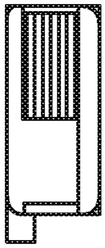
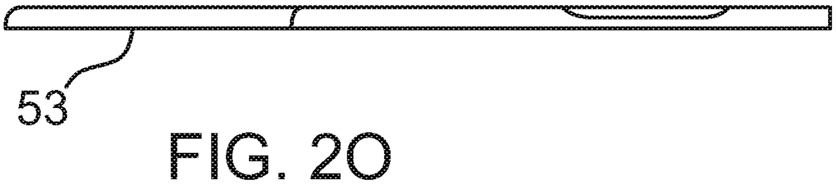
FIG. 2O
FIG. 2N
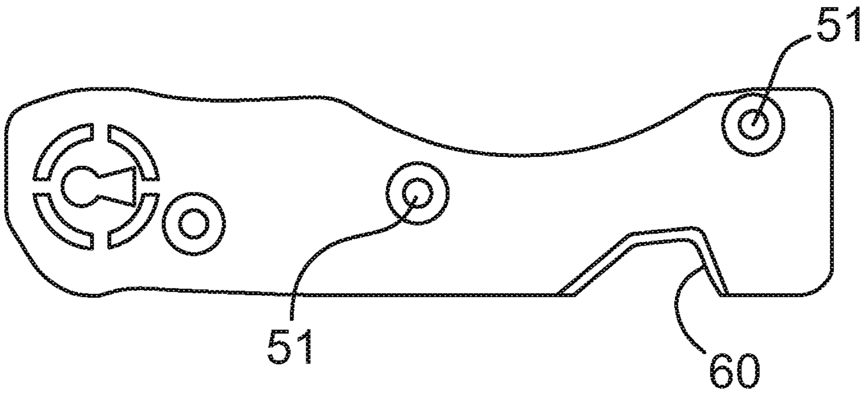
FIG. 2P
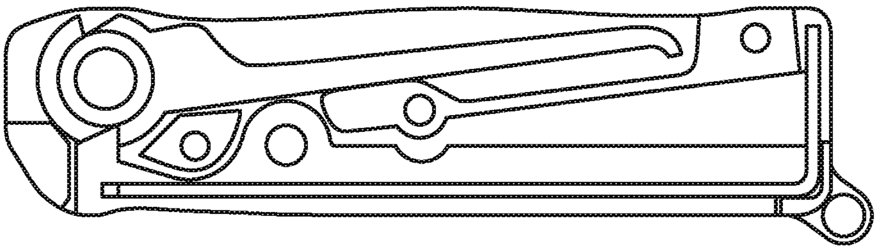
FIG. 2Q

FOLDING LOCK PICK SET

FIELD

The present disclosure relates to a multicomponent tool, and more particularly it relates to a folding lock pick set which facilitates efficient storage and a release mechanism for the tension wrench.

BACKGROUND

When a lock needs to be picked one requires two tools including a lock pick and a tension wrench. One of the more common kinds of lock picks for the pin-tumbler type of lock is a small flat tool with one or more projections thereon. The tension wrench or tool is also to be used with this lock pick, where the tension wrench is used to turn the keyway, or exert a turning force on the keyway in the lock. The pick is inserted into the lock and moved forwardly and backwardly along the keyway pushing the pins up. By careful manipulation with the lock pick and tension wrench, the pins will align themselves to the open position and the lock opens. While a lock pick folder is not new the conventional once all have very awkward ways of storing the tension wrench.

It would be very advantageous to provide a lock pick folder that provides a better locking and release mechanism for the tension wrench.

SUMMARY

The present disclosure discloses a folding lock pick set having a set of lock picks pivotally mounted in the housing at their proximal ends, a locking bar pivotally mounted at its proximal end which is adjacent to the pivotally mounted proximal ends of the lock picks. An L-shaped tension wrench is stored inside the locking bar. The tension wrench is released by the depressing locking bar so that the back end of the shorter section of the tension wrench lowers past the fame of the housing and this allows for the tension wrench to slide out the distal end of the housing. When the locking mechanism/bar is not depressed the tension wrench sits securely inside the housing. The proximal end of the locking bar includes a pawl which engages two (2) cut-outs in the proximal ends of the lock picks, one cut-out being engaged by the pawl when the picks are stored in the housing to prevent them rotating out of the housing, and the other being engaged by the pawl when a given lock pick is rotated out of the housing to prevent it from rotating while the lock operation is ongoing.

The present disclosure provides a multicomponent tool, comprising a housing and a first tool pivotally mounted at its proximal end in the housing; a lock bar pivotally attached at its proximal end in the housing that when unlocked allows the first tool to pivot in and out of the housing. The lock bar includes a storage location therein and at least a second tool is stored in the storage location which upon the lock bar being engage to allow pivoting of the first tool out of the housing, a portion of a second tool is forced out of the housing to be grasped and removed from the lock bar.

the mechanism coupled to said lock bar for biasing said lock bar back to its locked position once released may be a spring located between the distal end of the lock bar and a center stop on the interior of the housing such that upon releasing the distal end of the lock bar the spring biases the lock bar back to a locked position in which the first and second tools are locked inside the housing.

In a non-limiting example, the present disclosure provides a folding lock pick set which comprises:

a housing and a set of lock picks pivotally mounted at their proximal ends in a proximal end of the housing, with the distal ends of said lock picks configured to engage a lock. The proximal ends of each of the lock picks has two opposed cut-outs. A lock bar is pivotally mounted at its proximal end adjacent to the proximal ends of the set of lock pics and the lock bar has an elongate slot located therein. An L-shaped tension wrench having an elongate section that is housed in the elongate slot and the shorter section contained within the housing when the lock pick set is assembled and stored and locked.

The proximal end of the lock bar may have a pawl configured to engage the opposed cut-outs, and includes a biasing mechanism coupled to the lock bar for biasing the lock bar back to its locked position once released. A distal end of the housing has an opening, wherein upon depressing a distal end of the lock bar an end of the shorter section of the L-shaped tension wrench is pushed through the opening wherein it can slide out of said housing. Upon depressing the distal end of the lock bar disengages the pawl from a first of the two opposed cut-outs allowing for rotation of a selected lock pick out of the housing substantially 180 degrees with respect to the housing, and releasing said lock bar causes the pawl to engage the second cut-out to lock the pick in the open position.

The housing may include a center stop bolted on an interior of the housing that acts as a stop for the locking bar when it is being depressed.

The mechanism coupled to the lock bar for biasing the lock bar back to its locked position once released may be a spring located between the distal end of the lock bar and the center stop on the interior of the housing such that upon releasing the distal end of the lock bar the spring biases the lock bar back to a lock position in which the lock pics and the L-shaped tension wrench are locked inside the housing.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which:

FIG. 1A to 1J show various views of the lock pic set from different perspectives in which:

FIGS. 1A and 1B are perspective views of the assembled tool looking at the same side of the tool but the view in 1B is reversed compared to 1A;

FIG. 1C is a bottom view looking at the set of lock picks inserted into the housing of the tool;

FIG. 1D is a side view of the tool;

FIG. 1E is a side view of the tool similar to FIG. 1D but looking from the other side of the tool;

FIG. 1F is a top view opposite to FIG. 1C looking down at the locking bar;

FIGS. 1G and 1H are perspective views similar to FIGS. 1A and 1B but looking at the other side of the tool compared to FIGS. 1A and 1B;

FIG. 1I shows an end view looking along arrow I of FIG. 1A.

FIG. 1J is shows an end view looking along arrow J of FIG. 1B.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms “comprises” and “comprising” are to be construed as being inclusive and open ended, and not exclusive. Specifically, when used in the specification and claims, the terms “comprises” and “comprising” and variations thereof mean the specified features, steps or components are included. These terms are not to be interpreted to exclude the presence of other features, steps or components.

As used herein, the term “exemplary” means “serving as an example, instance, or illustration,” and should not be construed as preferred or advantageous over other configurations disclosed herein.

As used herein, the term “approximately” is meant to cover variations that may exist in the upper and lower limits of the ranges of values, such as variations in properties, parameters, and dimensions.

While the teachings described herein are in conjunction with various embodiments for illustrative purposes, it is not intended that these teachings be limited to such embodiments. On the contrary, the teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

The present disclosure provides a multicomponent tool, comprising a housing and a first tool pivotally mounted at its proximal end in the housing; a lock bar pivotally attached at its proximal end in the housing that when unlocked allows the first tool to pivot in and out of the housing. The lock bar includes a storage location therein and at least a second tool is stored in the storage location which upon the lock bar being engage to allow pivoting of the first tool out of the housing, a portion of a second tool is forced out of the housing to be grasped and removed from the lock bar. The tool may be a folding knife or other folding multicomponent tools, screw drivers etc. to mention some non-limiting examples which employ a lock bar for locking the tool(s) when deployed out of the housing and locking them inside the housing when not in use.

Figure 1A:
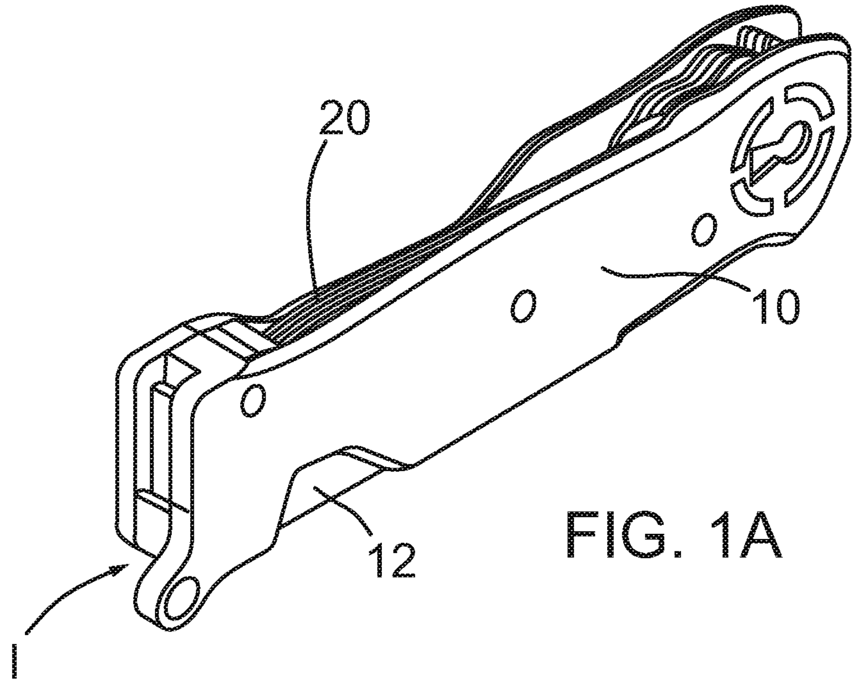
Figure 1B:
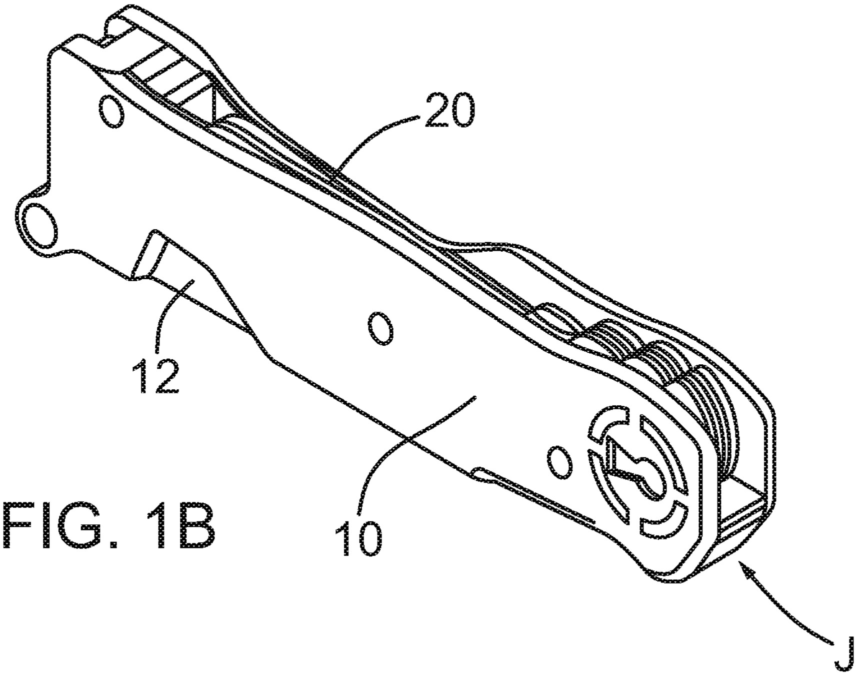
Figure 1C:
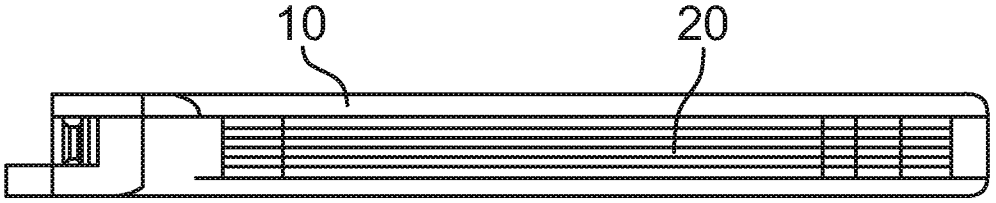
Figure 1D:
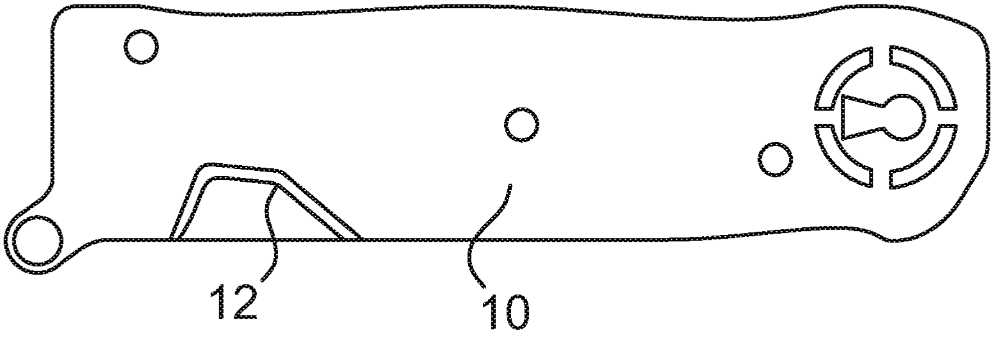
Figure 1E:
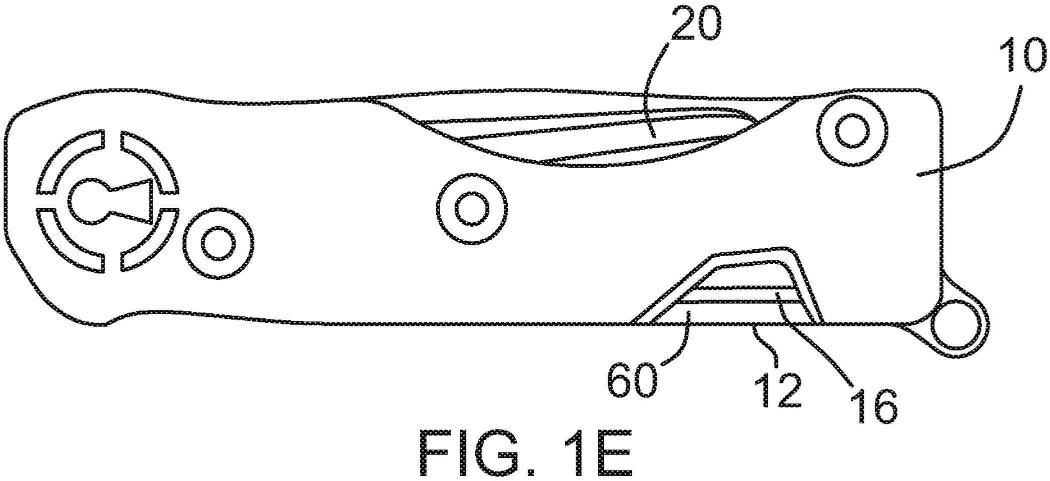
Figure 1F:
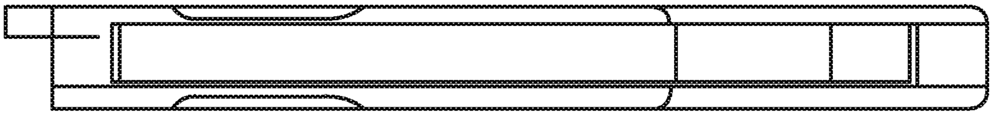
Figure 1G:
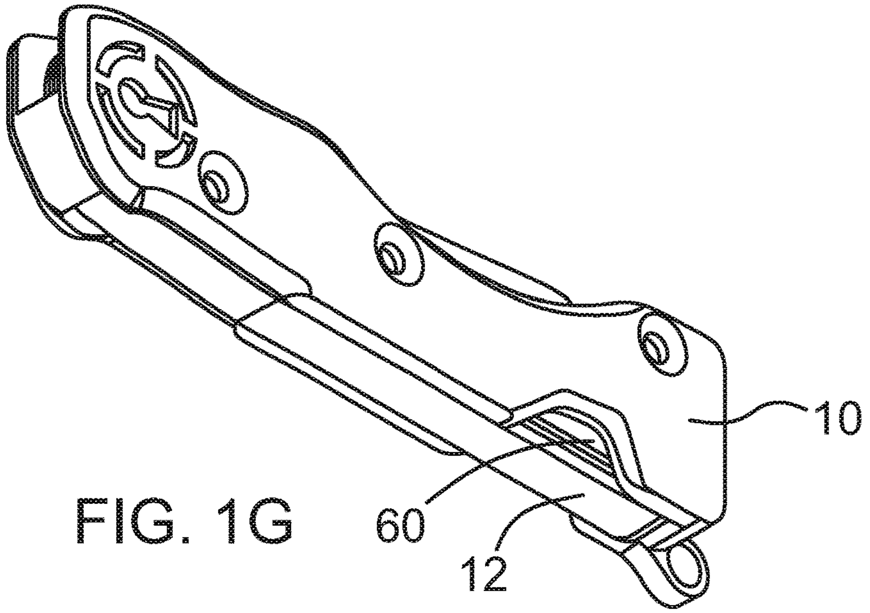
Figure 1H:
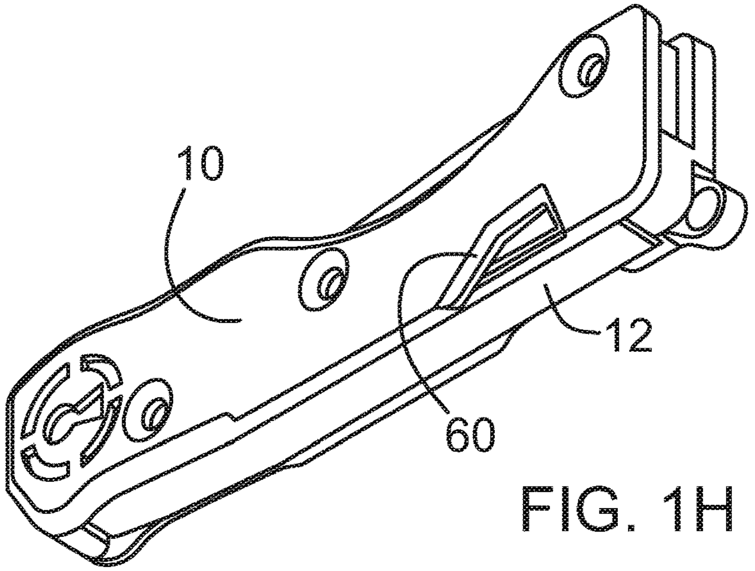
Figure 1I:
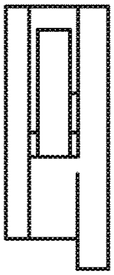
Figure 1J:
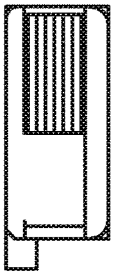
Figures 2A, 2B, 2C, 2D, 2E:
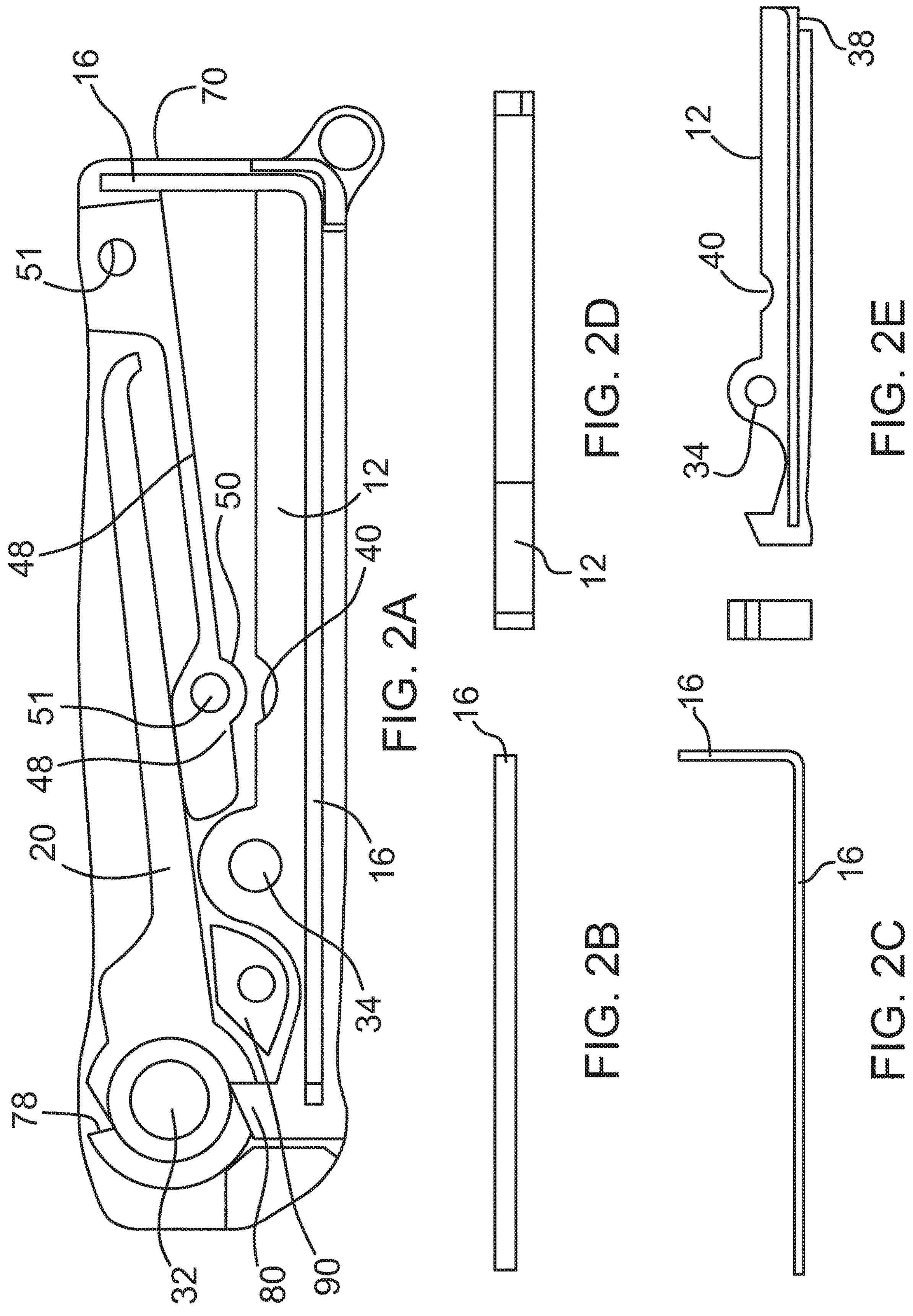
FIGS. 2A to 2Q show all the components of the folding lock pick set.
Figure 2F:
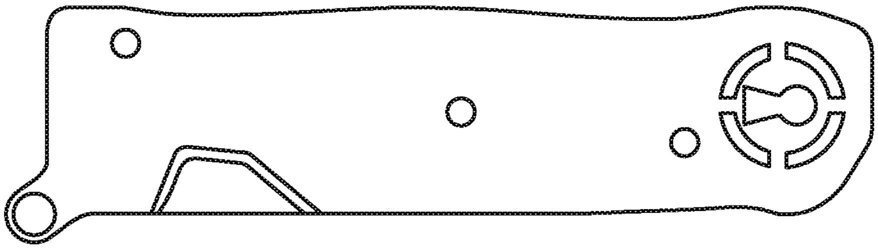
Figure 2G:
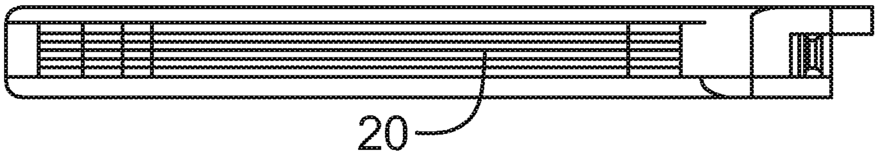
Figure 2H:
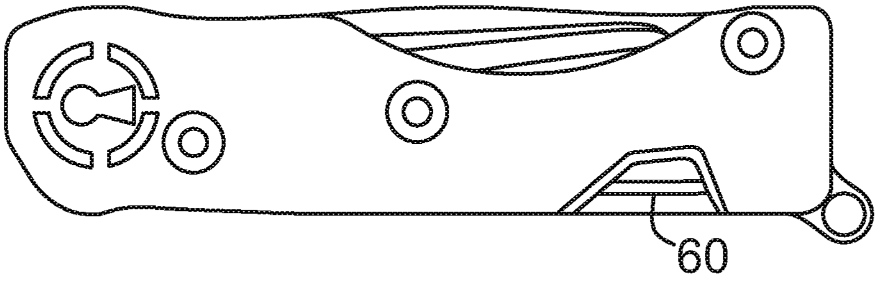
Figure 2I:

Referring to FIGS. 1A to 2Q, the folding lock pick set disclosed herein comprises a housing 10, a set of lock picks 20 having and end 30 pivotally mounted in housing 10 so that they pivot around pivot point 32 (FIG. 2A). FIG. 2G shows a top view in which the multiple picks 20 are visible. A locking bar 12 is pivotally mounted in housing 10 and hinges about hinge point 34. Locking bar 12 has an elongated slot 38 (FIG. 2E) located along its length and an elongated L-shaped tension wrench 16 is stored therein. The side view of locking bar 12 is shown in FIG. 2E and includes an indent 40 on the bottom side thereof which receives the hemispherical projection 50 located in a center spacer 48. Center spacer 48 is integrally formed with one side of housing 10 so it does not move, see FIG. 2L. nonmoving integrated part of the rest of the housing 10. Center spacer 48 has two threaded holes 51 (see FIG. 2L) that allow for the other side panel 53 (see FIG. 2O) of housing 10 to be attached by bolts. A spacer 90 is part of the housing section to which center spacer 48 is attached to. It has a threaded hole that allows the other side of housing 10 to be attached thereto. The spacer 90 is needed to allow for the free movement of lock picks 20 and the locking bar 12 between the two sides of the housing 10.

Included is a mechanism coupled to the lock bar for biasing the lock bar back to its locked position once lock bar 12 is released. In a non-limiting embodiment, the mechanism is a spring (not shown) located between the distal end of the lock bar 12 and the center stop 48 on the interior of the housing 10 such that upon releasing the distal end of the lock bar 12 the spring biases the lock bar 12 back to a lock position in which the lock pics 20 and the L-shaped tension wrench 17 are locked inside the housing 10.

In operation, when it is required to be used, the operator first removes the tension wrench 16. This is accomplished by depressing the locking bar 12 at the location of the cutout 60 in housing 10 (see FIGS. 1H and 2H). The lock bar 12 then pivots about pivot point 34 and pivots until hemispherical projection 50 on center spacer 48 is seated in indent 40. Since center spacer 48 is stationary it acts as a stop for locking bar 12 once hemispherical projection 50 is seated in indent 40.

The single locking bar 12 not only locks the tools (lock picks) into place when in use it also securely holds the tension wrench in way that stills allows for easy accessibility. The lock picks 20 have two (2) cutouts 78 at their proximal ends adjacent to the pivot point 32 and the end of the locking bar 12 has a pawl 80. When the locking bar 12 is depressed the pawl 80 lifts out of the cutout allowing the picks to rotated open. Once fully open the locking bar 12 is released and the pawl 80 lowers into a cutout 78 locking the picks 20 in the open position. The tail end 70 (see FIG. 2A) of the lock pick housing 10 has an opening for the tension wrench 16 to slide out of when the locking bar 12 is fully depressed.

When lock bar 12 is fully depressed by the user, the shorter side of the L-shaped tension wrench 16 is pushed down so the end of the shorter section of the tension wrench 16 is forced below the housing and can be grasped by the user and pulled out. When the locking bar 12 is not depressed the tension wrench 16 sits above this opening and sits entirely in housing 10 so it cannot slide out. Put another way, access the wrench 16 is provided by the user depressing the bar 12 and when the locking bar is depressed with a finger until the tension bar has lowered to the opening in the tail cap. The housing 10 can then be turned to let the tension wrench 16 slide out by gravity. By the operator removing their finger from the locking bar 12 it will move back to its original position. Once the tension wrench 16 is removed, the user grasps the desired pick and rotates it about pivot 32 until it is fully out of housing 10 and collinear with housing 10 at 180 degrees.

Once the operator is finished picking the lock, the reverse procedure is followed, first the pick(s) are pivoted back into housing 10 by pressing down the locking bar 12 to lift the pawl 80 letting the picks rotate back to their storage position within housing 10. Once the lock picks 20 are in the storage position with the locking bar 12 still depressed the wrench 16 can also be slid into the it's storage position within slot 38 within the locking bar 12. Once the lock picks and tension wrench are in the storage position the locking bar 12 is then released so that the pawl 80 engages with one of the cutouts 78 of each pick 20 which locks the picks 20 in the stored position, with the tension wrench 16 securely drawn within the housing 10.

Typically, the present lock pick set will contain several different lock picks and the user selects the one they want and rotates it out of housing 10 and locked in the open position while the rest are locked in the housing 10. Also, while this is a folding lock pick and tension wrench but the concept of storing a tool in a locking bar is unique and the other tools besides tension wrenches may be used. For example the present device may be other than lock picks, for example storing tools in the lock bar may be adapted for other devices where multi-tool components are present, such as but not limited to knives and other multi tools.

What is claimed is:

1. A multicomponent tool, comprising:

a housing and a first tool pivotally mounted at its proximal end in said housing;

a lock bar having a distal and proximal end and being pivotally attached at its proximal end in said housing such that when unlocked allows the first tool to pivot in and out of said housing, said lock bar including an elongate storage location therein;

at least a second tool stored in said elongate storage location which when the lock bar is engaged, a portion of said at least second tool is forced out of the housing to be grasped and removed from the elongate storage location in the lock bar; and a mechanism coupled to said lock bar for biasing said lock bar back to a locked position in the housing once released.

2. The multicomponent tool according to claim 1, wherein said mechanism coupled to said lock bar for biasing said lock bar back to its locked position once released is a spring located between the distal end of the lock bar and a center stop on the interior of the housing such that upon releasing the distal end of the lock bar the spring biases the lock bar back to a locked position in which the first and second tools are locked inside the housing.

3. The multicomponent tool according to claim 1, wherein said first elongate tool is a suite of elongate tools of different shapes and configurations.

4. A folding lock pick set, comprising:

a housing;

a set of lock picks pivotally mounted at their proximal ends in a proximal end of said housing, said distal ends of said lock picks configured to engage a lock, said proximal ends of said set of lock picks having two opposed cut-outs;

a lock bar pivotally mounted at its proximal end adjacent to the proximal ends of the set of lock picks, said lock bar having an elongate storage slot therein for receiving therein a tool;

said proximal end of the lock bar having a pawl configured to engage said opposed cut-outs, a mechanism coupled to said lock bar for biasing said lock bar back to a locked position once released; and a distal end of said housing having an opening, wherein upon depressing a distal end of said lock bar an end of the tool is pushed through said opening wherein it can slide out of said housing, and wherein depressing said distal end of said lock bar disengages said pawl from a first of said two opposed cut-outs allowing for rotation of a selected lock pick out of said housing substantially 180 degrees with respect to said housing, and releasing said lock bar causes the pawl to engage the second cut-out to lock the lock pick in the open position.

5. The folding lock pick set according to claim 4, wherein said tool is an L-shaped tension wrench having an elongate section that is housed in said elongate slot and shorter section contained within the housing when the lock pick set is assembled, and wherein upon depressing the lock bar the shorter section of said L-shaped tension wrench is pushed below an edge of the housing to be grasped and slid out of the lock bar.

6. The folding lock pick set according to claim 5, wherein said housing includes a center stop bolted on an interior of the housing that acts as a stop for the lock bar when it is being depressed.

7. The folding lock pick set according to claim 6, wherein said mechanism coupled to said lock bar for biasing said lock bar back to its locked position once released is a spring located between the distal end of the lock bar and a center stop on the interior of the housing such that upon releasing the distal end of the lock bar the spring biases the lock bar back to a lock position in which the lock picks and the L-shaped tension wrench are locked inside the housing.

8. The folding lock pick set according to claim 5, wherein said mechanism coupled to said lock bar for biasing said lock bar back to its locked position once released is a spring located between the distal end of the lock bar and a center stop on the interior of the housing such that upon releasing the distal end of the lock bar the spring biases the lock bar back to a lock position in which the lock picks and the L-shaped tension wrench are locked inside the housing.

9. The folding lock pick set according to claim 4, wherein said housing includes a center stop bolted on an interior of the housing that acts as a stop for the lock bar when it is being depressed.

10. The folding lock pick set according to claim 9, wherein said mechanism coupled to said lock bar for biasing said lock bar back to its locked position once released is a spring located between the distal end of the lock bar and a center stop on the interior of the housing such that upon releasing the distal end of the lock bar the spring biases the lock bar back to a lock position in which the lock picks and the L-shaped tension wrench are locked inside the housing.

11. The folding lock pick set according to claim 4, wherein said mechanism coupled to said lock bar for biasing said lock bar back to its locked position once released is a spring located between the distal end of the lock bar and a center stop on the interior of the housing such that upon releasing the distal end of the lock bar the spring biases the lock bar back to a lock position in which the lock pics and the L-shaped tension wrench are locked inside the housing.

12. The folding lock pick set according to claim 4, wherein said first elongate tool is a suite of elongate tools of different shapes and configurations.

* * * * *